United States Patent
Nam (10) Patent No.: US 7,693,645 B2
(45) Date of Patent: Apr. 6, 2010

(54) METHOD AND APPARATUS FOR CONTROLLING LOW PRESSURE EGR VALVE OF A TURBOCHARGED DIESEL ENGINE

(75) Inventor: Kihoon Nam, Gunpo (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 124 days.

(21) Appl. No.: 11/970,322

(22) Filed: Jan. 7, 2008

(65) Prior Publication Data

US 2009/0125217 A1    May 14, 2009

(30) Foreign Application Priority Data

Nov. 9, 2007    (KR) .................. 10-2007-0114297

(51) Int. Cl.
*F02D 41/00* (2006.01)
(52) U.S. Cl. ............... 701/108; 123/568.21; 60/605.2; 60/611
(58) Field of Classification Search ........... 701/108; 123/568.12, 568.16, 568.21, 568.23, 568.24, 123/568.26, 568.27; 60/605.2, 611
See application file for complete search history.

(56) References Cited

U.S. PATENT DOCUMENTS

| 6,725,847 B2 * | 4/2004 | Brunemann et al. .... 123/568.12 |
| 7,155,332 B2 * | 12/2006 | Yamada et al. ............. 701/108 |
| 7,178,326 B2 * | 2/2007 | Kojima et al. ............... 60/278 |
| 7,260,468 B2 * | 8/2007 | Durand et al. .............. 701/101 |
| 7,367,188 B2 * | 5/2008 | Barbe et al. ............... 60/605.2 |
| 7,398,149 B2 * | 7/2008 | Ueno et al. ................. 701/108 |
| 2009/0063023 A1 * | 3/2009 | Nagae ........................ 701/108 |
| 2009/0077967 A1 * | 3/2009 | Gates et al. ............... 60/605.2 |
| 2009/0077968 A1 * | 3/2009 | Sun ........................... 60/605.2 |

FOREIGN PATENT DOCUMENTS

KR    1020040026832 A    4/2004

* cited by examiner

*Primary Examiner*—Stephen K Cronin
*Assistant Examiner*—Johnny H Hoang
(74) *Attorney, Agent, or Firm*—Morgan, Lewis & Bockius LLP (57) ABSTRACT

A low pressure EGR valve is controlled by mixing EGR gas into an intake air. Steps of the method include detecting temperature and pressure of an intake air passing through an air cleaner, detecting temperature and pressure of the intake air at a downstream side of an intercooler, detecting temperature and pressure of an EGR gas at an upstream side of an EGR cooler, determining a control duty of the low pressure EGR valve on the basis of the detected temperature and pressure of the air passing through the air cleaner, the detected temperature and pressure at the downstream side of the intercooler, and the detected temperature and pressure at the upstream side of the EGR cooler, and controlling the low pressure EGR valve based on the determined control duty. An apparatus for executing the method is also provided.

10 Claims, 3 Drawing Sheets

METHOD AND APPARATUS FOR CONTROLLING LOW PRESSURE EGR VALVE OF A TURBOCHARGED DIESEL ENGINE

CROSS-REFERENCE TO RELATED APPLICATION

This application claims priority to and the benefit of Korean Patent Application No. 10-2007-0114297 filed in the Korean Intellectual Property Office on Nov. 9, 2007, the entire contents of which are incorporated herein by reference.

BACKGROUND OF THE INVENTION (a) Field of the Invention

The present invention relates to a diesel engine. More particularly, the present invention relates to a method for controlling exhaust gas recirculation (EGR) of a diesel engine.

(b) Description of the Related Art

Typically a diesel engine is provided with an exhaust gas recirculation (EGR) system that recirculates a part of an exhaust gas into an intake system such that the temperature of burning gas in the combustion chamber can be lowered so as to reduce the generation of NOx.

While an engine is driven, a target air amount is set depending on driving states, and an optimal mixture of the recirculated exhaust gas and the fresh air is obtained by controlling an EGR duty ratio for controlling an EGR valve in the EGR system. Typically, the optimal values for controlling the EGR valve depending on driving states are preset as a map table, and then the EGR valve is controlled according to the map table considering a current engine state of the engine.

A diesel engine may be provided with a turbocharger in order to increase an output power of the engine, to reduce the emission, or to enhance fuel consumption. In a typical diesel engine with a turbocharger, a high-temperature and high-pressure exhaust gas before the turbocharger is partially taken to be recirculated.

According to such a method, an EGR gas is of a very high temperature even if it may be passed through an EGR intercooler, and a raw gas exhausted from the engine is forwarded to the engine. Therefore, only limited effect of reducing emission may be obtained. For example, such a method may be used to satisfy a Euro 4 regulation, however, it will be very difficult to satisfy stricter emission control regulations such as Euro 5, Euro 6, and US Tier II Bin 5 with such scheme.

Recently, a low pressure EGR system is under the investigation in order to satisfactorily reduce the emission of the diesel engine. According to the low pressure EGR system, the exhaust gas is typically taken after a diesel particulate filter (DPF) to be recirculated into the engine.

In such a scheme, the length of the path of the EGR gas becomes longer in comparison with a typical high pressure EGR system, and thus the pressure of the EGR gas that is returned to the engine is low. Such features cause precise controllability to be deteriorated, and thus, a scheme for enhancing precise control of the low pressure EGR system is highly desired in the field.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention has been made in an effort to provide a method and apparatus for controlling a low pressure EGR valve of a turbocharged diesel engine having advantages of enhanced responsiveness of controlling an EGR rate According to an exemplary embodiment of the present invention, an apparatus for controlling a low pressure EGR valve that mixes an EGR gas into an intake air includes: an engine speed detector for detecting an engine speed; an engine load detector for detecting an engine load, an intake air mass detector for detecting an intake air mass passing through an air cleaner; an intake air temperature detector for detecting an intake air temperature passing through an air cleaner; an intercooler downstream-side temperature detector for detecting an intake air temperature at a downstream side of the intercooler; an intercooler downstream-side pressure detector for detecting an intake air pressure at the downstream side of the intercooler; an EGR cooler upstream-side temperature detector for detecting an EGR gas temperature at an upstream side of an EGR cooler; an EGR cooler upstream-side pressure detector for detecting an EGR gas pressure at an upstream side of an EGR cooler; and a controller for controlling the low pressure EGR valve on the basis of the detected values of the engine speed detector, the engine load detector, the intake air mass detector, the intake air temperature detector, the intercooler downstream-side temperature detector, the intercooler downstream-side pressure detector, the EGR cooler upstream-side temperature detector, and the EGR cooler upstream-side pressure detector.

The controller may include at least one processor that executes a predetermined program, and the predetermined program may include a set of instructions for performing a method according to an exemplary embodiment of the present invention.

An exemplary embodiment of the present invention also includes a method for controlling a low pressure EGR valve that mixes an EGR gas into an intake air, wherein the method includes: detecting temperature of an intake air passing through an air cleaner; detecting a mass flow rate of the intake air passing through the air cleaner; detecting temperature and pressure of the intake air at a downstream side of an intercooler; detecting temperature and pressure of an EGR gas at an upstream side of an EGR cooler; determining a control duty of the low pressure EGR valve on the basis of the detected temperature and mass flow rate of the air passing through the air cleaner, the detected temperature and pressure at the downstream side of the intercooler, and the detected temperature and pressure at the upstream side of the EGR cooler; and controlling the low pressure EGR valve based on the determined control duty.

The determining control duty of the low pressure EGR valve may include: estimating temperature, pressure, and mass flow rate at the upstream side of the intercooler on the basis of the temperature and mass flow rate at the downstream side of the intercooler; estimating temperature, pressure, and mass flow rate at the upstream side of the turbocharger on the basis of the estimated temperature, pressure, and mass flow rate at the upstream side of the intercooler; estimating temperature, pressure, and mass flow rate of the EGR gas at the downstream side of the EGR cooler on the basis of the EGR gas temperature and pressure at the upstream side of the EGR cooler; and calculating the control duty of the low pressure EGR valve on the basis of the estimated mass flow rate at the upstream side of the turbocharger, the estimated temperature and mass flow rate of the EGR gas at the downstream side of the EGR cooler, and the detected temperature and mass flow rate of the air passing through the air cleaner.

The temperature, pressure, and mass flow rate of the intake air at the upstream side of the intercooler may be estimated by equations of:

$$P_1 - P_2 = \frac{1}{2}\rho u^2 \quad \text{(Equation 1)}$$
$$= k\frac{W^2}{\rho};$$

$$T_2 = T_1 - \varepsilon(T_1 - T_{Coolant}); \text{ and} \quad \text{(Equation 2)}$$

$$\dot{P}_2 = \frac{R}{c_v V}(c_p W T_1 - c_p W T_2), \quad \text{(Equation 3)}$$

where, $P_1$ denotes the pressure at the upstream side of the intercooler, $P_2$ denotes the pressure at the downstream side of the intercooler, $T_1$ denotes the temperature at the upstream side of the intercooler, $T_2$ denotes the temperature at the downstream side of the intercooler, $\rho$ denotes density of gas passing through the intercooler, W denotes mass per time (i.e., mass flow rate) of gas passing through the intercooler, k denotes a constant, $\varepsilon$ denotes cooling efficiency of the intercooler, $T_{Coolant}$ denotes temperature of coolant for cooling the intercooler, R denotes a gas constant, Cv denotes a specific heat at constant pressure, Cp denotes a specific heat at constant volume, and V denotes a volume of the intercooler.

The temperature, pressure, and mass flow rate of the intake air at the downstream side of the EGR cooler may be estimated by equations of:

$$P_1 = P_2; \quad \text{(Equation 1)}$$

$$T_2 = T_1 - \varepsilon(T_1 - T_{Coolant}); \text{ and} \quad \text{(Equation 2)}$$

$$\dot{P}_2 = \frac{R}{c_v V}(c_p W T_1 - c_p W T_2), \quad \text{(Equation 3)}$$

where, $P_1$ denotes the pressure at the upstream side of the EGR cooler, $P_2$ denotes the pressure at the downstream side of the EGR cooler, $T_1$ denotes the temperature at the upstream side of the EGR cooler, $T_2$ denotes the temperature at the downstream side of the EGR cooler, $\rho$ denotes density of gas passing through the EGR cooler, W denotes mass per time (mass flow rate) of gas passing through the EGR cooler, k denotes a constant, $\varepsilon$ denotes cooling efficiency of the EGR cooler, $T_{Coolant}$ denotes temperature of coolant for cooling the EGR cooler, R denotes a gas constant, Cv denotes a specific heat at constant pressure, Cp denotes a specific heat at constant volume, V denotes a volume of the EGR cooler.

The control duty of the low pressure EGR valve may be calculated by equations of:

$$\dot{P}_2 = \frac{R}{c_{v2}V_2}(c_{p1}W_{12}T_1 + c_{p4}W_{42}T_4 - c_{p2}W_{23}T_2); \quad \text{(Equation 1)}$$

$$c_{p2} = (1 - Z_{EGR})c_{p1} + Z_{EGR}c_{p4}; \quad \text{(Equation 2)}$$

$$Z_{EGR} = \frac{m_{2Exh}}{m_{2Air} + m_{2Exh}}; \quad \text{(Equation 3)}$$

$$T_2 = \frac{P_2 V_2}{m_2 R}; \quad \text{(Equation 4)}$$

-continued $$m_2 = m_{2Air} + m_{2Exh}; \quad \text{(Equation 5)}$$

$$\dot{m}_{2Air} = W_{12} - (1 - Z_{EGR})W_{23}; \quad \text{(Equation 6)}$$

$$\dot{m}_{2Exh} = W_{42} - Z_{EGR}W_{23}; \text{ and} \quad \text{(Equation 7)}$$

$$PWM_{EGR} = f(N_{rpm}, Z_{EGR}), \quad \text{(Equation 8)}$$

where, $P_2$ denotes pressure inside the mixing region, $T_1$ denotes a temperature of air passing through the air cleaner, $T_2$ denotes a temperature inside the mixing region, $T_4$ denotes a temperature of the EGR gas inputted into the mixing region, $W_{12}$ denotes mass per time (i.e., mass flow rate) of air inputted from the air cleaner into the mixing region, $W_{42}$ denotes mass per time (i.e., mass flow rate) of the EGR gas inputted into the mixing region, $W_{23}$ denotes mass per time (i.e., mass flow rate) of the mixture gas outputted from the mixing region to the turbocharger, $m_2$ denotes gas mass inside the mixing region, $m_{2air}$ denotes air mass inside the mixing region, $m_{2Exh}$ denotes EGR gas mass inside the mixing region, $Z_{EGR}$ denotes an EGR rate, $PWM_{EGR}$ denotes the control duty, and dot notation of a variable denotes a time derivative thereof.

An exemplary method for controlling a low pressure EGR valve of a turbocharged diesel engine according to an exemplary embodiment of the present invention may further include: detecting an engine speed and an engine load; obtaining a target air mass based on the engine speed and the engine load; calculating a deviation between the target air mass and the mass flow rate of the intake air; and controlling the low pressure EGR valve based on the Calculated deviation, the low pressure EGR valve having been controlled based on the determined control duty.

According to an exemplary embodiment, the low pressure EGR valve may promptly realize a desired EGR rate.

DETAILED DESCRIPTION OF THE EMBODIMENTS

In the following detailed description, exemplary embodiments of the present invention have been shown and described, simply by way of illustration. As those skilled in the art would realize, the described embodiments may be modified in various different ways, all without departing from the spirit or scope of the present invention. In the drawing, reference numerals generally indicate components as follows:

150: ECU
105: diesel particulate filter (DPF)
103: EGR exhaust pipe

-continued

Figure 1:
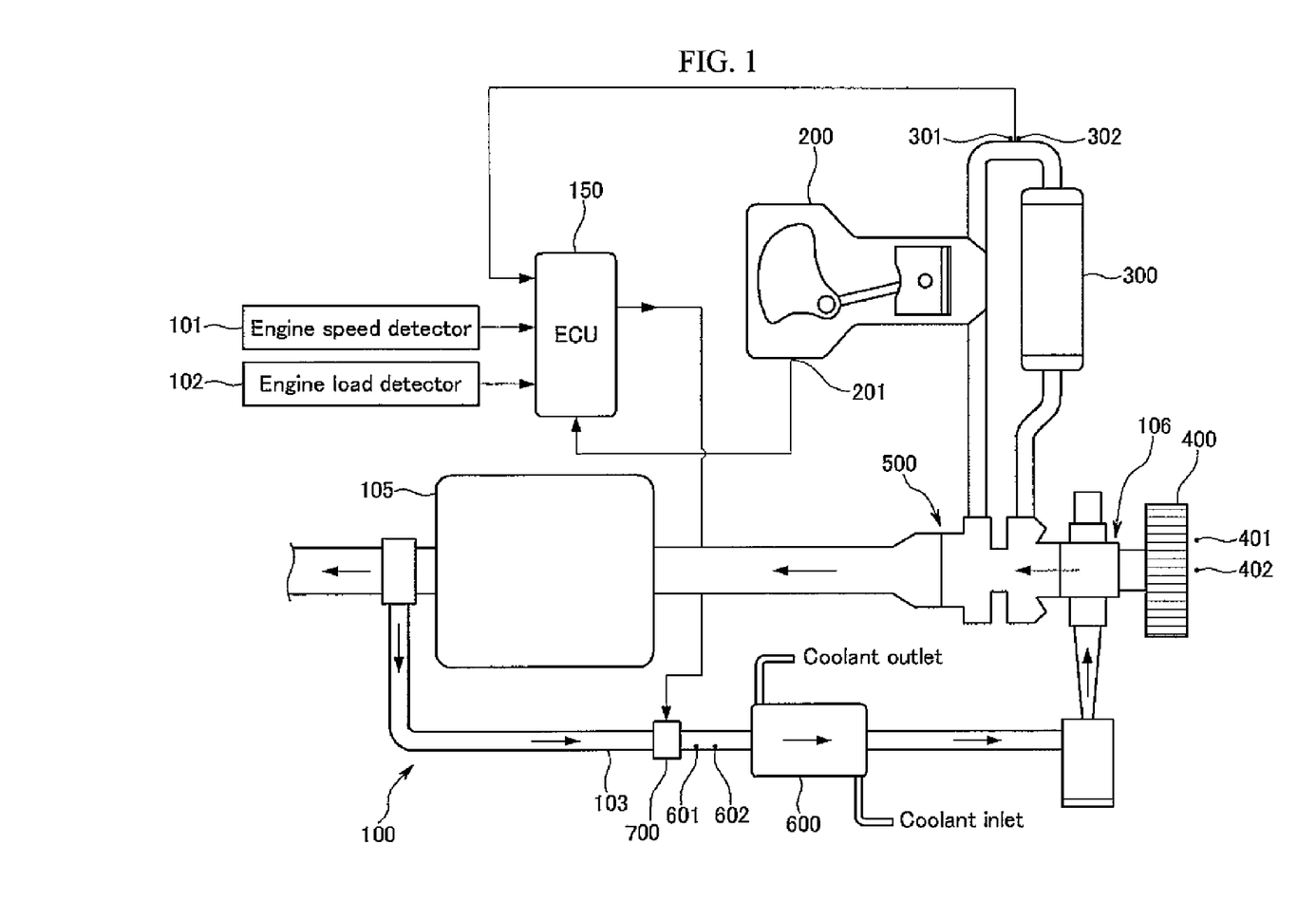
FIG. 1 is a schematic diagram showing a low pressure EGR system of a diesel engine according to an exemplary embodiment of the present invention.

106: mixing region
200: engine
300: intercooler
400: air cleaner
500: turbocharger
600: EGR cooler
700: low pressure EGR valve
101: Engine speed detector
102: Engine load detector
201: coolant temperature detector
301: intercooler downstream-side temperature detector
302: intercooler downstream-side pressure detector
401: intake air mass detector
402: intake air temperature detector
601: EGR cooler upstream-side temperature detector
602: EGR cooler upstream-side pressure detector As shown in FIG. 1, an entire engine system according to an exemplary embodiment of the present invention includes a low pressure EGR system 100 according to an exemplary embodiment of the present invention, an engine 200, an intercooler 300, an air cleaner 400, and a turbocharger 500. The engine 200 generates power by combustion of a mixture gas, the air cleaner 400 purifies an air drawn to the engine 200, the turbocharger 500 forcefully drives the air into the engine by using an exhaust gas of the engine 200. The intercooler 300 cools the air that is heated at the turbocharger and is drawn to the engine 200.

In the low pressure EGR system 100, a particulate matter filter (DPF) 105 is arranged on an exhaust pipe connected to a downstream side of the turbocharger 500. An EGR exhaust pipe 103 for the recirculation of the exhaust gas is branched from a downstream side exhaust pipe of the particulate matter filter 102. An EGR cooler 600 is arranged on the EGR exhaust pipe 103, so as to cool the recirculation exhaust gas.

The recirculation exhaust gas cooled by the EGR cooler 600 is mixed with fresh air supplied through the air cleaner 400 at a mixing region 106. Such a mixture gas of the recirculation exhaust gas and the fresh air is supplied to the engine 200 through the intercooler 300. The amount of the EGR gas is controlled by a low pressure EGR valve 700 arranged at an upstream side of the EGR cooler 600, and the low pressure EGR valve 700 is controlled by PWM duty signal of an engine control unit (ECU) 150.

Figure 2:
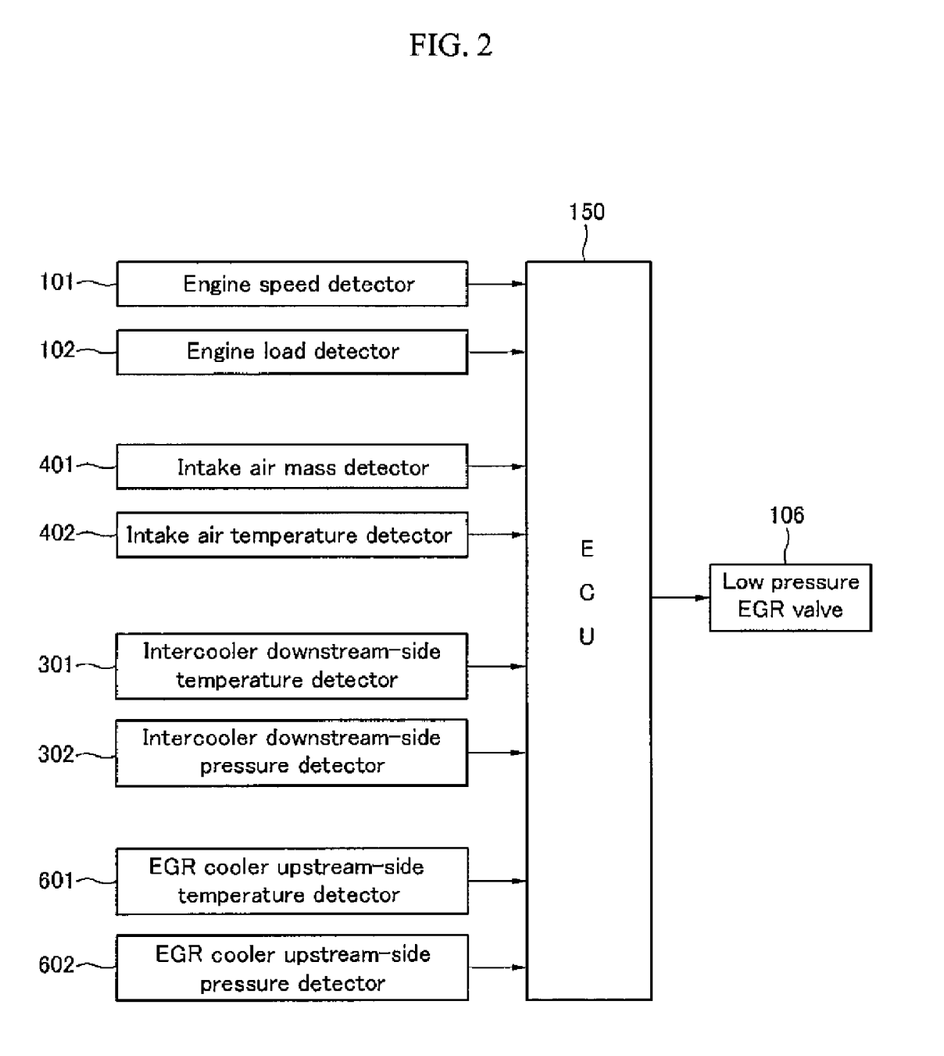
FIG. 2 is a block diagram of an apparatus for controlling a low pressure EGR valve of a turbocharged diesel engine according to an exemplary embodiment of the present invention.

An apparatus for controlling a low pressure EGR valve of a turbocharged diesel engine according to an exemplary embodiment of the present invention includes an engine speed detector 101, an engine load detector 102, an intake air mass detector 401, an intake air temperature detector 402, an intercooler downstream-side temperature detector 301, an intercooler downstream-side pressure detector 302, an EGR cooler upstream-side temperature detector 601, an EGR cooler upstream-side pressure detector 602, and the engine control unit (ECU) 150.

The engine speed detector 101 detects an engine speed. The engine load detector 102 detects an engine load. The intake air mass detector 401 detects an intake air mass passing through the air cleaner 400. The intake air temperature detector 402 detects an intake air temperature passing through the air cleaner 400. The intercooler downstream-side temperature detector 301 detects an intake air temperature at a downstream side of the intercooler 300. The intercooler downstream-side pressure detector 302 detects an intake air pressure at the downstream side of the intercooler 300. The EGR cooler upstream-side temperature detector 601 detects an EGR gas temperature at an upstream side of the EGR cooler 600. The EGR cooler upstream-side pressure detector 602 detects an EGR gas pressure at the upstream side of the EGR cooler 600. The ECU 150 controls the low pressure EGR valve 700 based on the detected values of the engine speed detector 101, the engine load detector 102, the intake air mass detector 401, the intake air temperature detector 402, the intercooler downstream-side temperature detector 301, the intercooler downstream-side pressure detector 302, the EGR cooler upstream-side temperature detector 601, and the EGR cooler upstream-side pressure detector 602.

The engine speed detector 101 may comprise a crank angle sensor. The engine load detector 102 may comprise an accelerator position sensor.

The intake air mass detector 401, the intake air temperature detector 402, the intercooler downstream-side temperature detector 301, the intercooler downstream-side pressure detector 302, the EGR cooler upstream-side temperature detector 601, and the EGR cooler upstream-side pressure detector 602 may be realized as is obvious to a person or ordinary skill in the art.

The ECU 150 may include at least one processor that executes a predetermined program, and the predetermined program may include a set of instructions for performing a method according to an exemplary embodiment of the present invention. The ECU further may include memory and other hardware and software and firmware as may be selected by programmed by a person of ordinary skill based on the teachings herein.

Hereinafter, a method for controlling a low pressure EGR valve of a turbocharged diesel engine according to an exemplary embodiment of the present invention will be described in detail with reference to FIG. 3.

Figure 3:
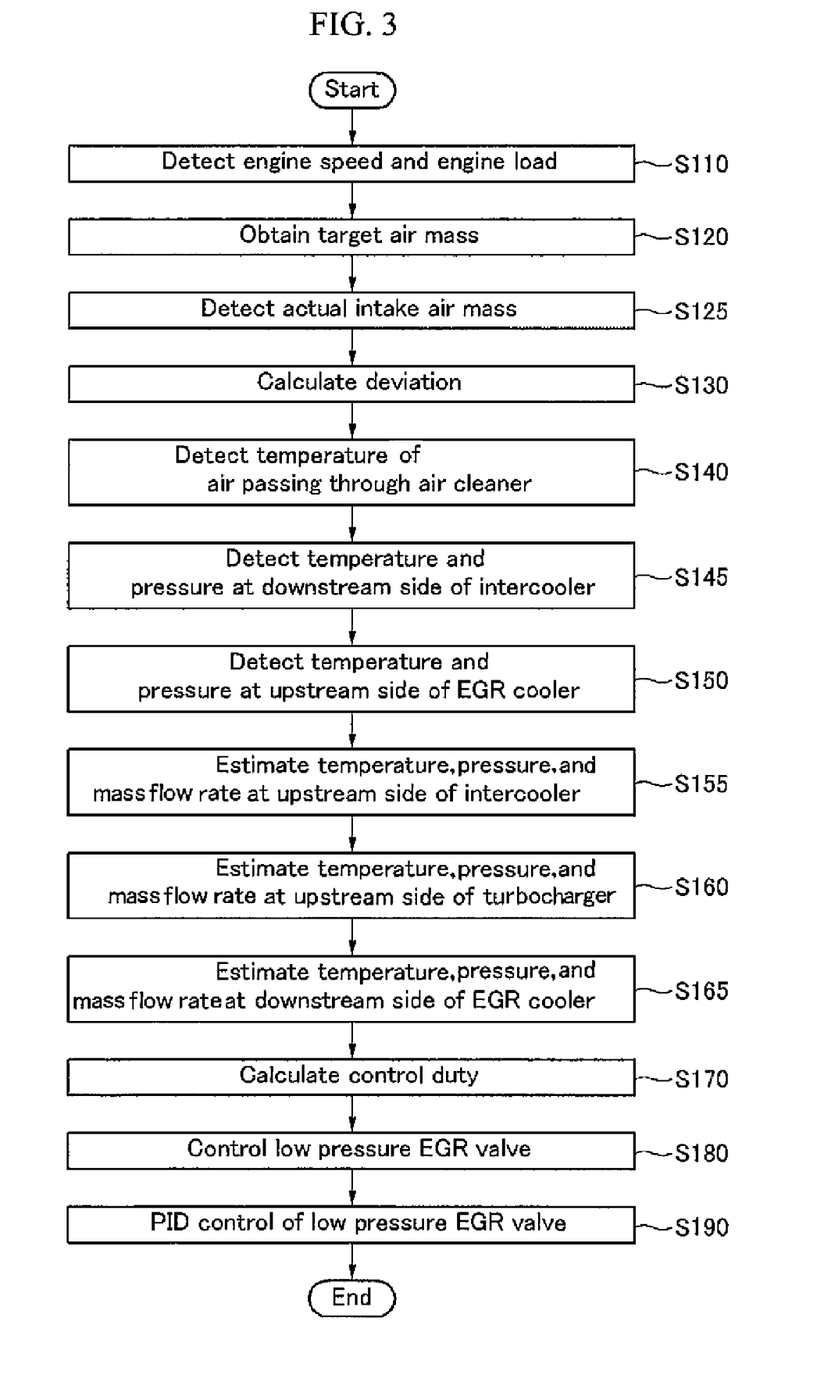
FIG. 3 is a flowchart that shows a method for controlling exhaust gas recirculation (EGR) of a diesel engine according to an exemplary embodiment of the present invention.

As shown in FIG. 3, the ECU 150 firstly detects an engine speed and an engine load at step S110. The engine speed may be detected by the engine speed detector 101, and the engine load may be detected by the engine load detector 102.

Then, the ECU 150 obtains a target air mass based on the engine speed and the engine load at step S120. The target air mass may be retrieved from a predetermined map table stored in the ECU 150.

At step S125, the ECU 150 detects an actual intake air mass that passes through the air cleaner 400. The actual intake air mass may be detected by the intake air mass detector 401.

At step S130, the ECU 150 calculates a deviation between the target air mass and the actual intake air mass.

According to a conventional method for controlling a low pressure EGR valve, the low pressure EGR valve 700 is merely controlled in a proportional-integral-derivative (PID) control scheme based on to the calculated deviation. However, according to an exemplary embodiment of the present invention, in order to enhance efficiency and responsiveness of the PID control of the low pressure EGR valve 700, a pre-control is employed prior to the PID control of the low pressure EGR valve 700.

In more detail, at step S140, the ECU 150 detects an intake air temperature of an air passing through the air cleaner 400. The intake air temperature may be detected by the intake air temperature detector 402.

At step S145, the ECU 150 detects intake air temperature and pressure at a downstream side of the intercooler 300. The intake air temperature and pressure at the downstream side of the intercooler 300 may be detected by the intercooler downstream-side temperature detector 301 and the intercooler downstream-side pressure detector 302.

At step S150, the ECU 150 detects EGR gas temperature and pressure at the upstream side of the EGR cooler 600. The EGR gas temperature and pressure at the upstream side of the EGR cooler 600 may be detected by the EGR cooler upstream-side temperature detector 601 and the EGR cooler upstream-side pressure detector 602.

Then, from steps S155 to S170., the ECU 150 determines a control duty of the low pressure EGR valve 700 on the basis of the detected temperature and intake air mass of the air passing through the air cleaner 400, the detected temperature and pressure at the downstream side of the intercooler 300, and the detected temperature and pressure at the upstream side of the EGR cooler 600. Hereinafter, the process of determining the control duty of the low pressure EGR valve 700 according to an exemplary embodiment of the present invention is described in further detail.

At step S155, the ECU 150 estimates temperature, pressure, and mass flow rate of the intake air at the upstream side of the intercooler 300 on the basis of the intake air temperature and pressure at the downstream side of the intercooler 300.

At step S160, the ECU 150 estimates temperature, pressure, and mass flow rate at an upstream side of the turbocharger 500 (in more detail, an upstream side of a compressor of the turbocharger 500) on the basis of the estimated temperature, pressure, and mass flow rate at the upstream side of the intercooler 300.

At step S165, the ECU 150 estimates temperature, pressure, and mass flow rate of the EGR gas at the downstream side of the EGR cooler 600 on the basis of the EGR gas temperature and pressure at the upstream side of the EGR cooler 600.

At step S170, the ECU 150 calculates the control duty of the low pressure EGR valve 700 on the basis of the estimated mass flow rate at the downstream side of the turbocharger 500, the estimated temperature and mass flow rate of the EGR gas at the downstream side of the EGR cooler 600, and the detected temperature and mass flow rate (i.e., the intake air mass) of the air passing through the air cleaner 400.

Hereinafter, each of the steps S155, S160, S165, and S170 will be described in further detail.

At the step S155, the temperature, the pressure, and the mass flow rate of the intake air at the upstream side of the intercooler is estimated by the following Equation 1 to Equation 3.

$$P_1 - P_2 = \frac{1}{2}\rho u^2 \quad \text{(Equation 1)}$$
$$= k\frac{W^2}{\rho},$$

$$T_2 = T_1 - \varepsilon(T_1 - T_{Coolant}), \quad \text{(Equation 2)}$$

$$\dot{P}_2 = \frac{R}{c_v V}(c_p W T_1 - c_p W T_2) \quad \text{(Equation 3)}$$

Here, $P_1$ denotes the pressure at the upstream side of the intercooler, $P_2$ denotes the pressure at the downstream side of the intercooler, $T_1$ denotes the temperature at the upstream side of the intercooler, $T_2$ denotes the temperature at the downstream side of the intercooler, $\rho$ denotes density of gas passing through the intercooler, W denotes mass per time (i.e., mass flow rate) of gas passing through the intercooler, k denotes a constant, $\varepsilon$ denotes cooling efficiency of the intercooler, $T_{Coolant}$ denotes temperature of coolant for cooling the intercooler, R denotes a gas constant, Cv denotes a specific heat at constant pressure, Cp denotes a specific heat at constant volume, and V denotes a volume of the intercooler.

Since the intercooler is air-cooled, the coolant for cooling the intercooler is an air, and thus $T_{Coolant}$ is an air temperature.

For example, the temperature of the intake air detected by the intake air temperature detector may be used as $T_{Coolant}$.

Here, the value of ρ is retrieved from a predetermined map stored in the ECU 150 depending on the engine speed. In addition, the value of ε is retrieved from a predetermined map stored in the ECU 150 depending on the engine speed and a fuel injection amount.

At the step S160, the temperature, the pressure, and the mass flow rate at the upstream side of the turbocharger 500 may be estimated from a predetermined compression map of the turbocharger 500.

At the step S165, the temperature, the pressure, and the mass flow rate of the intake air at the downstream side of the EGR cooler may be estimated by the following Equation 4 to Equation 6.

$$P_1 - P_2 = \frac{1}{2}\rho u^2 \quad \text{(Equation 4)}$$
$$= k\frac{W^2}{\rho},$$

$$T_2 = T_1 - \varepsilon(T_1 - T_{Coolant}), \quad \text{(Equation 5)}$$

$$\dot{P}_2 = \frac{R}{c_v V}(c_p W T_1 - c_p W T_2) \quad \text{(Equation 6)}$$

Here, $P_1$ denotes the pressure at the upstream side of the EGR cooler, $P_2$ denotes the pressure at the downstream side of the EGR cooler, $T_1$ denotes the temperature at the upstream side of the EGR cooler, $T_2$ denotes the temperature at the downstream side of the EGR cooler, $\rho$ denotes density of gas passing through the EGR cooler, W denotes mass per time (i.e., the mass flow rate) of gas passing through the EGR cooler, k denotes a constant, $\varepsilon$ denotes cooling efficiency of the EGR cooler, $T_{Coolant}$ denotes temperature of coolant for cooling the EGR cooler, R denotes a gas constant, Cv denotes a specific heat at constant pressure, Cp denotes a specific heat at constant volume, V denotes a volume of the EGR cooler.

Here, the value of ρ is retrieved from a predetermined map stored in the ECU 150 depending on the engine speed. In addition, the value of ε is retrieved from a predetermined map stored in the ECU 150 depending on the engine speed and a fuel injection amount.

According to an exemplary embodiment of the present invention, it is assumed that there is no pressure drop between the upstream side and the downstream side of the EGR cooler 600. That is, it is assumed that $P_1=P_2$. According to such an assumption, the temperature and the mass flow rate at the downstream side of the EGR cooler are obtained by the Equation 5 and Equation 6.

At the step S170, the control duty of the low pressure EGR valve 700 may be calculated by the following Equation 7 to Equation 14.

$$\dot{P}_2 = \frac{R}{c_{v2}V_2}(c_{p1}W_{12}T_1 + c_{p4}W_{42}T_4 - c_{p2}W_{23}T_2) \quad \text{(Equation 7)}$$

$$c_{p2} = (1 - Z_{EGR})c_{p1} + Z_{EGR}c_{p4} \quad \text{(Equation 8)}$$

$$Z_{EGR} = \frac{m_{2Exh}}{m_{2Air} + m_{2Exh}} \quad \text{(Equation 9)}$$

$$T_2 = \frac{P_2 V_2}{m_2 R} \quad \text{(Equation 10)}$$

$$m_2 = m_{2Air} + m_{2Exh} \quad \text{(Equation 11)}$$

-continued $$\dot{m}_{2Air} = W_{12} - (1 - Z_{EGR})W_{23} \quad \text{(Equation 12)}$$

$$\dot{m}_{2Exh} = W_{42} - Z_{EGR}W_{23} \quad \text{(Equation 13)}$$

$$PWM_{EGR} = f(N_{rpm}, Z_{EGR}) \quad \text{(Equation 14)}$$

Here, $P_2$ denotes pressure inside the mixing region 106, $T_1$ denotes a temperature of air passing through the air cleaner, $T_2$ denotes a temperature inside the mixing region 106, $T_4$ denotes a temperature of the EGR gas inputted into the mixing region 106, $W_{12}$ denotes mass per time (i.e., mass flow rate) of air inputted from the air cleaner into the mixing region 106, $W_{42}$ denotes mass per time (i.e., mass flow rate) of the EGR gas inputted into the mixing region 106, $W_{23}$ denotes mass per time (i.e., mass flow rate) of the mixture gas outputted from the mixing region 106 to the turbocharger 500, $m_2$ denotes gas mass inside the mixing region 106, $m_{2air}$ denotes air mass inside the mixing region 106, $m_{2Exh}$ denotes EGR gas mass inside the mixing region 106, $Z_{EGR}$ denotes an EGR rate, and dot notation of a variable denotes a time derivative thereof In the above Equations 7 to 14, the subscript 1 denotes variables related to a position of the air cleaner, the subscript 2 denotes variables related to the inside of the mixing region 106, the subscript 3 denotes variables related to the upstream side of the turbocharger 500, and the subscript 4 denotes variables related to the downstream side of the EGR cooler 600.

By the Equations 7 to 11, the EGR rate $Z_{EGR}$ is obtained, and the control duty $PWM_{EGR}$ of the EGR valve 700 is obtained by the Equation 12 as a function of the EGR rate $Z_{EGR}$ and the engine speed. The function of the Equation 12 may be set by a person of ordinary skill in the art taking into account of an engine specification.

When the control duty is determined as such, the ECU 150 controls the low pressure EGR valve 700 based on the determined control duty at step S180.

By such an initial control, the low pressure EGR valve 700 is initially controlled to an expected value before a PID control. Therefore, the low pressure EGR valve 700 may be controlled to a desired EGR rate by the PID control earlier than by merely controlling the low pressure EGR valve 106 by the PID control.

At step S190, when the low pressure EGR valve 700 is controlled to realize the initial EGR rate, the ECU 150 controls the low pressure EGR valve 700 by a PID control based on the deviation calculated at the step S130.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for controlling a low pressure EGR valve that mixes an EGR gas into an intake air, the method comprising:

detecting temperature of an intake air passing through an air cleaner;

detecting a mass flow rate of the intake air passing through the air cleaner;

detecting temperature and pressure of the intake air at a downstream side of an intercooler;

detecting temperature and pressure of an EGR gas at an upstream side of an EGR cooler;

determining a control duty of the low pressure EGR valve on the basis of the detected temperature and mass flow rate of the air passing through the air cleaner, the detected temperature and pressure at the downstream side of the intercooler, and the detected temperature and pressure at the upstream side of the EGR cooler; and controlling the low pressure EGR valve based on the determined control duty;

wherein the determining control duty of the low pressure EGR valve comprises:

estimating temperature, pressure, and mass flow rate at the upstream side of the intercooler on the basis of the temperature and mass flow rate at the downstream side of the intercooler;

estimating temperature, pressure, and mass flow rate at the upstream side of the turbocharger on the basis of the estimated temperature, pressure, and mass flow rate at the upstream side of the intercooler;

estimating temperature, pressure, and mass flow rate of the EGR gas at the downstream side of the EGR cooler on the basis of the EGR gas temperature and pressure at the upstream side of the EGR cooler; and calculating the control duty of the low pressure EGR valve on the basis of the estimated mass flow rate at the upstream side of the turbocharger, the estimated temperature and mass flow rate of the EGR gas at the downstream side of the EGR cooler, and the detected temperature and mass flow rate of the air passing through the air cleaner.

2. The method of claim 1, wherein the temperature, pressure, and mass flow rate of the intake air at the upstream side of the intercooler are estimated by equations of:

$$P_1 - P_2 = \frac{1}{2}\rho u^2 \quad \text{(Equation 1)}$$

$$= k\frac{W^2}{\rho},$$

$$T_2 = T_1 - \varepsilon(T_1 - T_{Coolant}); \text{ and} \quad \text{(Equation 2)}$$

$$\dot{P}_2 = \frac{R}{c_v V}(c_p W T_1 - c_p W T_2), \quad \text{(Equation 3)}$$

where, $P_1$ denotes the pressure at the upstream side of the intercooler, $P_2$ denotes the pressure at the downstream side of the intercooler, $T_1$ denotes the temperature at the upstream side of the intercooler, $T_2$ denotes the temperature at the downstream side of the intercooler, $\rho$ denotes density of gas passing through the intercooler, W denotes mass per time (i.e., mass flow rate) of gas passing through the intercooler, k denotes a constant, $\varepsilon$ denotes cooling efficiency of the intercooler, $T_{Coolant}$ denotes temperature of coolant for cooling the intercooler, R denotes a gas constant, Cv denotes a specific heat at constant pressure, Cp denotes a specific heat at constant volume, and V denotes a volume of the intercooler.

3. The method of claim 1, wherein the temperature, pressure, and mass flow rate of the intake air at the downstream side of the EGR cooler are estimated by equations of:

$$P_1 = P_2; \quad \text{(Equation 1)}$$

$$T_2 = T_1 - \varepsilon(T_1 - T_{Coolant}); \text{ and} \quad \text{(Equation 2)}$$

$$\dot{P}_2 = \frac{R}{c_v V}(c_p W T_1 - c_p W T_2), \quad \text{(Equation 3)}$$

where, $P_1$ denotes the pressure at the upstream side of the EGR cooler, $P_2$ denotes the pressure at the downstream side of the EGR cooler, $T_1$ denotes the temperature at the upstream side of the EGR cooler, $T_2$ denotes the temperature at the downstream side of the EGR cooler, $\rho$ denotes density of gas passing through the EGR cooler, W denotes mass per time (mass flow rate) of gas passing through the EGR cooler, k denotes a constant, $\varepsilon$ denotes cooling efficiency of the EGR cooler, $T_{Coolant}$ denotes temperature of coolant for cooling the EGR cooler, R denotes a gas constant, Cv denotes a specific heat at constant pressure, Cp denotes a specific heat at constant volume, V denotes a volume of the EGR cooler.

4. The method of claim 1, wherein the control duty of the low pressure EGR valve is calculated by equations of:

$$\dot{P}_2 = \frac{R}{c_{v2}V_2}(c_{p1}W_{12}T_1 + c_{p4}W_{42}T_4 - c_{p2}W_{23}T_2); \quad \text{(Equation 1)}$$

$$c_{p2} = (1 - Z_{EGR})c_{p1} + Z_{EGR}c_{p4}; \quad \text{(Equation 2)}$$

$$Z_{EGR} = \frac{m_{2Exh}}{m_{2Air} + m_{2Exh}}; \quad \text{(Equation 3)}$$

$$T_2 = \frac{P_2 V_2}{m_2 R}; \quad \text{(Equation 4)}$$

$$m_2 = m_{2Air} + m_{2Exh}; \quad \text{(Equation 5)}$$

$$\dot{m}_{2Air} = W_{12} - (1 - Z_{EGR})W_{23}; \quad \text{(Equation 6)}$$

$$\dot{m}_{2Exh} = W_{42} - Z_{EGR}W_{23}; \text{ and} \quad \text{(Equation 7)}$$

$$PWM_{EGR} = f(N_{rpm}, Z_{EGR}), \quad \text{(Equation 8)}$$

where, $P_2$ denotes pressure inside the mixing region, $T_1$ denotes a temperature of air passing through the air cleaner, $T_2$ denotes a temperature inside the mixing region, $T_4$ denotes a temperature of the EGR gas inputted into the mixing region, $W_{12}$ denotes mass per time (i.e., mass flow rate) of air inputted from the air cleaner into the mixing region, $W_{42}$ denotes mass per time (i.e., mass flow rate) of the EGR gas inputted into the mixing region, $W_{23}$ denotes mass per time (i.e., mass flow rate) of the mixture gas outputted from the mixing region to the turbocharger, $m_2$ denotes gas mass inside the mixing region, $m_{2air}$ denotes air mass inside the mixing region, $m_{2Exh}$ denotes EGR gas mass inside the mixing region, $Z_{EGR}$ denotes an EGR rate, $PWM_{EGR}$ denotes the control duty, and dot notation of a variable denotes a time derivative thereof.

5. A method for controlling a low pressure EGR valve that mixes an EGR gas into an intake air, the method comprising:

detecting temperature of an intake air passing through an air cleaner;

detecting a mass flow rate of the intake air passing through the air cleaner;

detecting temperature and pressure of the intake air at a downstream side of an intercooler;

detecting temperature and pressure of an EGR gas at an upstream side of an EGR cooler;

determining a control duty of the low pressure EGR valve on the basis of the detected temperature and mass flow rate of the air passing through the air cleaner, the detected temperature and pressure at the downstream side of the intercooler, and the detected temperature and pressure at the upstream side of the EGR cooler;

controlling the low pressure EGR valve based on the determined control duty;

detecting an engine speed and an engine load;

obtaining a target air mass based on the engine speed and the engine load;

calculating a deviation between the target air mass and the mass flow rate of the intake air; and controlling the low pressure EGR valve based on the calculated deviation, the low pressure EGR valve having been controlled based on the determined control duty.

6. An apparatus for controlling an EGR valve, comprising:

an engine speed detector for detecting an engine speed;

an engine load detector for detecting an engine load;

an intake air mass detector for detecting an intake air mass passing through an air cleaner;

an intake air temperature detector for detecting an intake air temperature passing through an air cleaner;

an intercooler downstream-side temperature detector for detecting an intake air temperature at a downstream side of the intercooler;

an intercooler downstream-side pressure detector for detecting an intake air pressure at the downstream side of the intercooler;

an EGR cooler upstream-side temperature detector for detecting an EGR gas temperature at an upstream side of an EGR cooler;

an EGR cooler upstream-side pressure detector for detecting an EGR gas pressure at an upstream side of an EGR cooler; and a controller for controlling the low pressure EGR valve on the basis of the detected values of the engine speed detector, the engine load detector, the intake air mass detector, the intake air temperature detector, the intercooler downstream-side temperature detector, the intercooler downstream-side pressure detector, the EGR cooler upstream-side temperature detector, and the EGR cooler upstream-side pressure detector, wherein the controller executes a set of instructions for:

detecting temperature of an intake air passing through an air cleaner;

detecting a mass flow rate of the intake air passing through the air cleaner;

detecting temperature and pressure of the intake air at a downstream side of an intercooler;

detecting temperature and pressure of an EGR gas at an upstream side of an EGR cooler;

determining a control duty of the low pressure EGR valve on the basis of the detected temperature and pressure of the air passing through the air cleaner, the detected temperature and pressure at the downstream side of the intercooler, and the detected temperature and pressure at the upstream side of the EGR cooler; and controlling the low pressure EGR valve based on the determined control duty; and wherein the determining control duty of the low pressure EGR valve comprises:

estimating temperature, pressure, and mass flow rate at the upstream side of the intercooler on the basis of the temperature and mass flow rate at the downstream side of the intercooler;

estimating temperature, pressure, and mass flow rate at the upstream side of the turbocharger on the basis of the estimated temperature, pressure, and mass flow rate at the upstream side of the intercooler;

estimating temperature, pressure, and mass flow rate of the EGR gas at the downstream side of the EGR cooler on the basis of the EGR gas temperature and pressure at the upstream side of the EGR cooler; and calculating the control duty of the low pressure EGR valve on the basis of the estimated mass flow rate at the upstream side of the turbocharger, the estimated temperature and mass flow rate of the EGR gas at the downstream side of the EGR cooler, and the detected temperature and mass flow rate of the air passing through the air cleaner.

7. The apparatus of claim 6, wherein the temperature, pressure, and mass flow rate of the intake air at the upstream side of the intercooler are estimated by equations of:

$$P_1 - P_2 = \frac{1}{2}\rho u^2 \quad \text{(Equation 1)}$$

$$= k\frac{W^2}{\rho};$$

$$T_2 = T_1 - \varepsilon(T_1 - T_{Coolant}); \text{ and} \quad \text{(Equation 2)}$$

$$\dot{P}_2 = \frac{R}{c_v V}(c_p W T_1 - c_p W T_2), \quad \text{(Equation 3)}$$

where, $P_1$ denotes the pressure at the upstream side of the intercooler, $P_2$ denotes the pressure at the downstream side of the intercooler, $T_1$ denotes the temperature at the upstream side of the intercooler, $T_2$ denotes the temperature at the downstream side of the intercooler, $\rho$ denotes density of gas passing through the intercooler, W denotes mass per time (i.e., mass flow rate) of gas passing through the intercooler, k denotes a constant, $\varepsilon$ denotes cooling efficiency of the intercooler, $T_{Coolant}$ denotes temperature of coolant for cooling the intercooler, R denotes a gas constant, Cv denotes a specific heat at constant pressure, Cp denotes a specific heat at constant volume, and V denotes a volume of the intercooler.

8. The apparatus of claim 6, wherein the temperature, pressure, and mass flow rate of the intake air at the downstream side of the EGR cooler are estimated by equations of:

$$P_1 = P_2; \quad \text{(Equation 1)}$$

$$T_2 = T_1 - \varepsilon(T_1 - T_{Coolant}); \text{ and} \quad \text{(Equation 2)}$$

$$\dot{P}_2 = \frac{R}{c_v V}(c_p W T_1 - c_p W T_2), \quad \text{(Equation 3)}$$

where, $P_1$ denotes the pressure at the upstream side of the EGR cooler, $P_2$ denotes the pressure at the downstream side of the EGR cooler, $T_1$ denotes the temperature at the upstream side of the EGR cooler, $T_2$ denotes the temperature at the downstream side of the EGR cooler, $\rho$ denotes density of gas passing through the EGR cooler, W denotes mass per time (mass flow rate) of gas passing through the EGR cooler, k denotes a constant, $\varepsilon$ denotes cooling efficiency of the EGR cooler, $T_{Coolant}$ denotes temperature of coolant for cooling the EGR cooler, R denotes a gas constant, Cv denotes a specific heat at constant pressure, Cp denotes a specific heat at constant volume, V denotes a volume of the EGR cooler.

9. The apparatus of claim 6, wherein the control duty of the low pressure EGR valve is calculated by equations of:

$$\dot{P}_2 = \frac{R}{c_{v2}V_2}(c_{p1}W_{12}T_1 + c_{p4}W_{42}T_4 - c_{p2}W_{23}T_2); \quad \text{(Equation 1)}$$

$$c_{p2} = (1 - Z_{EGR})c_{p1} + Z_{EGR}c_{p4}; \quad \text{(Equation 2)}$$

$$Z_{EGR} = \frac{m_{2Exh}}{m_{2Air} + m_{2Exh}}; \quad \text{(Equation 3)}$$

$$T_2 = \frac{P_2 V_2}{m_2 R}; \quad \text{(Equation 4)}$$

$$m_2 = m_{2Air} + m_{2Exh}; \quad \text{(Equation 5)}$$

$$\dot{m}_{2Air} = W_{12} - (1 - Z_{EGR})W_{23}; \quad \text{(Equation 6)}$$

$$\dot{m}_{2Exh} = W_{42} - Z_{EGR}W_{23}; \text{ and} \quad \text{(Equation 7)}$$

$$PWM_{EGR} = f(N_{rpm}, Z_{EGR}), \quad \text{(Equation 8)}$$

where, $P_2$ denotes pressure inside the mixing region, $T_1$ denotes a temperature of air passing through the air cleaner, $T_2$ denotes a temperature inside the mixing region, $T_4$ denotes a temperature of the EGR gas inputted into the mixing region, $W_{12}$ denotes mass per time (i.e., mass flow rate) of air inputted from the air cleaner into the mixing region, $W_{42}$ denotes mass per time (i.e., mass flow rate) of the EGR gas inputted into the mixing region, $W_{23}$ denotes mass per time (i.e., mass flow rate) of the mixture gas outputted from the mixing region to the turbocharger, $m_2$ denotes gas mass inside the mixing region, $m_{2air}$ denotes air mass inside the mixing region, $m_{2Exh}$ denotes EGR gas mass inside the mixing region, $Z_{EGR}$ denotes an EGR rate, $PWM_{EGR}$ denotes the control duty, and dot notation of a variable denotes a time derivative thereof.

10. An apparatus for controlling an EGR valve, comprising:

an engine speed detector for detecting an engine speed;

an engine load detector for detecting an engine load;

an intake air mass detector for detecting an intake air mass passing through an air cleaner;

an intake air temperature detector for detecting an intake air temperature passing through an air cleaner;

an intercooler downstream-side temperature detector for detecting an intake air temperature at a downstream side of the intercooler;

an intercooler downstream-side pressure detector for detecting an intake air pressure at the downstream side of the intercooler;

an EGR cooler upstream-side temperature detector for detecting an EGR gas temperature at an upstream side of an EGR cooler;

an EGR cooler upstream-side pressure detector for detecting an EGR gas pressure at an upstream side of an EGR cooler; and a controller for controlling the low pressure EGR valve on the basis of the detected values of the engine speed detector, the engine load detector, the intake air mass detector, the intake air temperature detector, the intercooler downstream-side temperature detector, the intercooler downstream-side pressure detector, the EGR cooler upstream-side temperature detector, and the EGR cooler upstream-side pressure detector, wherein the controller executes a set of instructions for:

detecting temperature of an intake air passing through an air cleaner;

detecting a mass flow rate of the intake air passing through the air cleaner;

detecting temperature and pressure of the intake air at a downstream side of an intercooler;

detecting temperature and pressure of an EGR gas at an upstream side of an EGR cooler;

determining a control duty of the low pressure EGR valve on the basis of the detected temperature and pressure of the air passing through the air cleaner, the detected temperature and pressure at the downstream side of the intercooler, and the detected temperature and pressure at the upstream side of the EGR cooler; and controlling the low pressure EGR valve based on the determined control duty; and wherein the controller further executes instructions for:

detecting an engine speed and an engine load;

obtaining a target air mass based on the engine speed and the engine load;

calculating a deviation between the target air mass and the mass flow rate of the intake air; and controlling the low pressure EGR valve based on the calculated deviation, the low pressure EGR valve having been controlled based on the determined control duty.

\* \* \* \* \*